June 14, 1927.
V. WEBER ET AL
1,632,355
THERMOSTATIC CONTROL MECHANISM
Filed Oct. 8, 1925
4 Sheets-Sheet 1
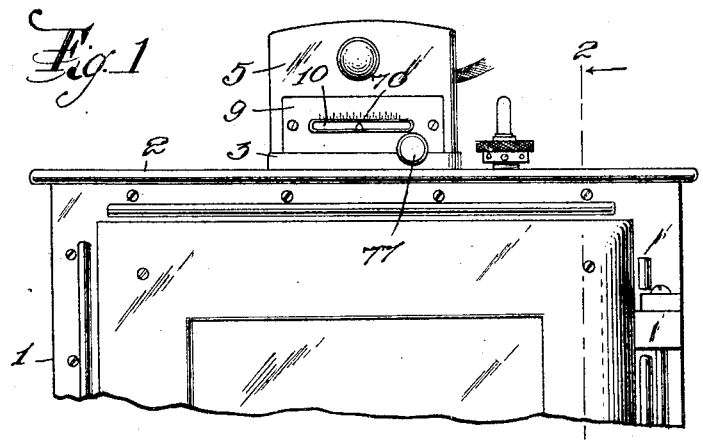
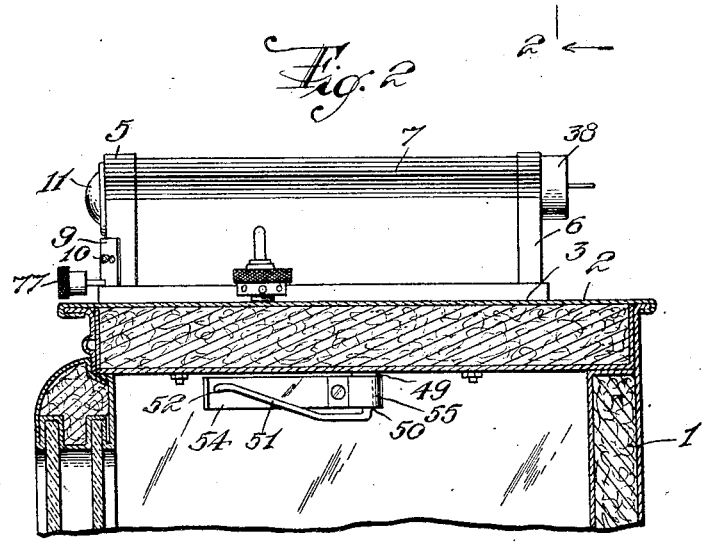
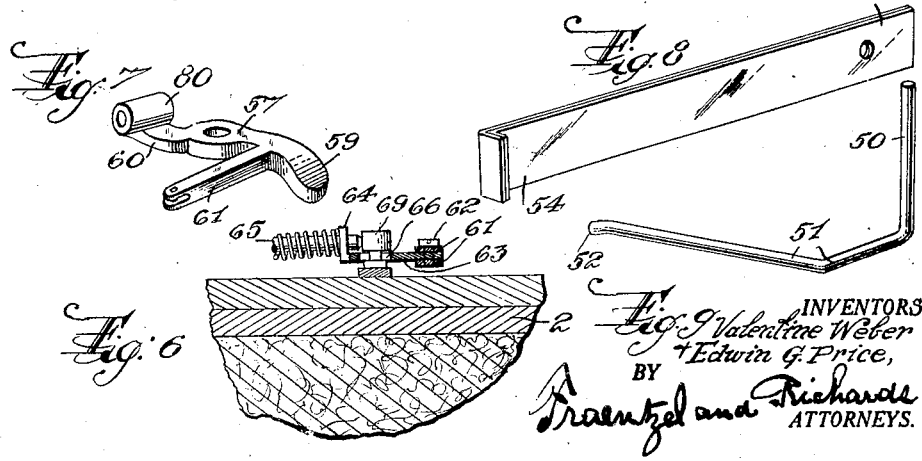
INVENTORS:
Valentine Weber
+ Edwin G. Price,
BY
Fraentzel and Richards,
ATTORNEYS.

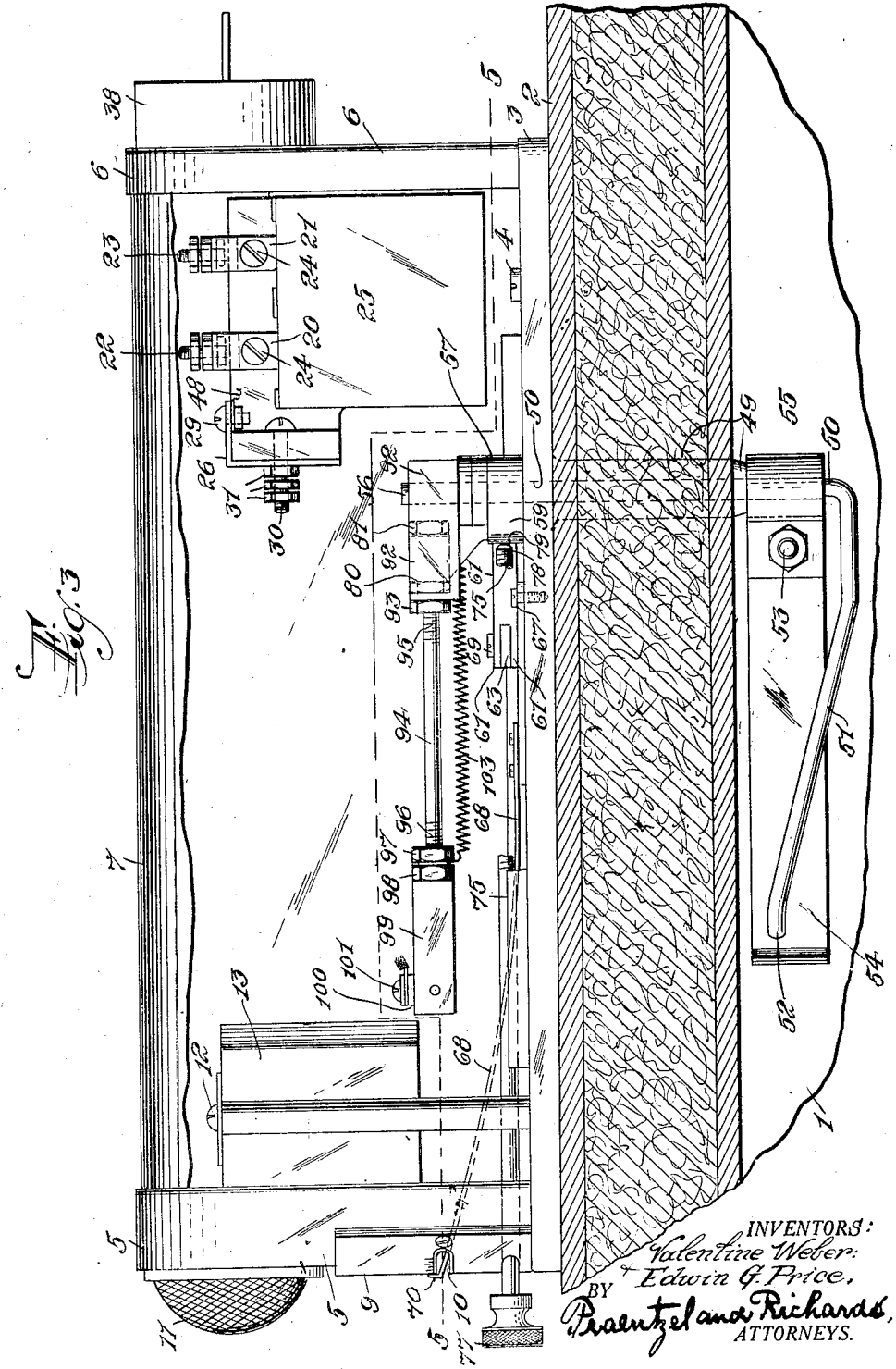

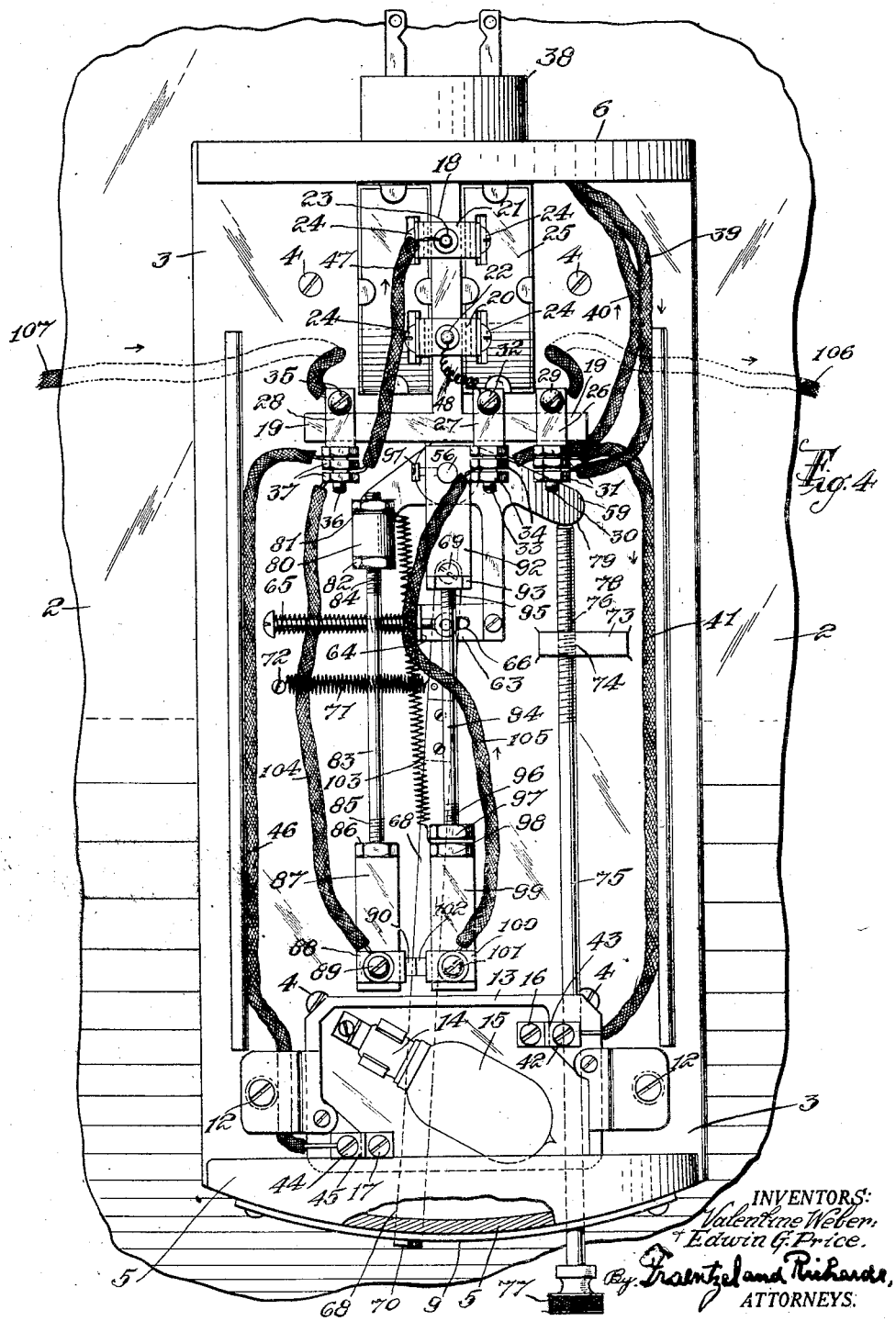

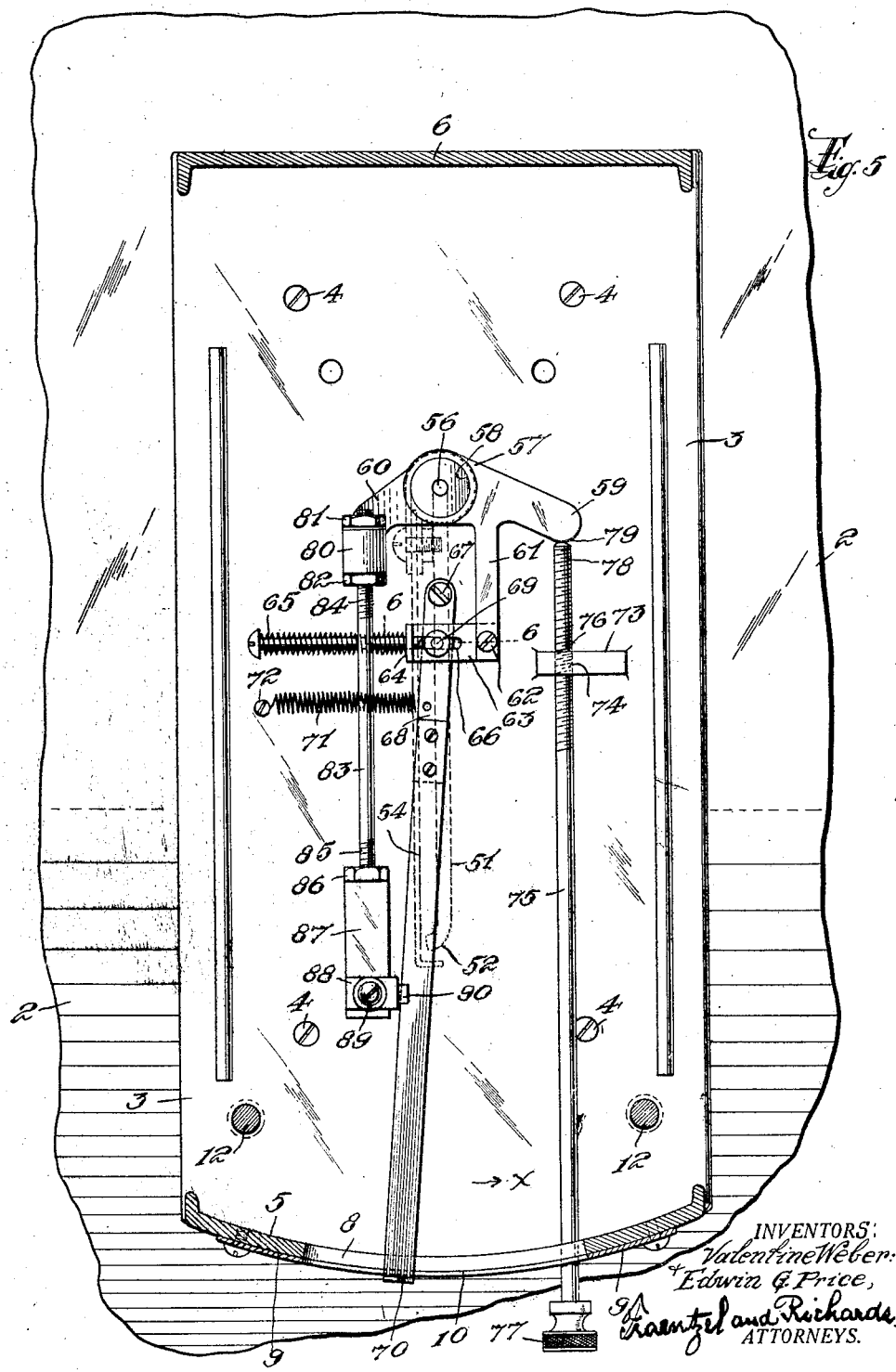

Patented June 14, 1927.

1,632,355

UNITED STATES PATENT OFFICE.

VALENTINE WEBER AND EDWIN G. PRICE, OF NEWARK, NEW JERSEY.

THERMOSTATIC CONTROL MECHANISM.

Application filed October 8, 1925. Serial No. 61,220.

This invention relates, generally, to improvements in thermostats; and, the present invention has reference, more particularly, to a novel and easily operated thermostatic control-mechanism which is especially adapted for use with heating units of the character and construction set forth and illustrated in an application for Letters-Patent filed by Valentine Weber, September 2nd, 1925, Serial No. 53,969/25.

The present invention has for its principal object to provide a novel and simply constructed thermostat, which is readily applied to electrical ovens or heaters of the character set forth in the herein-above stated application, and which is very sensitive and most efficient in its operation.

The invention has for its further object to provide a thermostatic control-mechanism having a strip of thermostatic metal, adapted to make mechanical contact with an oscillating rod, extending in an upward direction, at the rear end of said strip, through a bearing located in a base-plate, to make and break an electric circuit through a pair of electrical contacts located above said base-plate according to the action of the thermostatic strip with relation to the said oscillating rod.

The invention has for its further object, the provision of a novel and simply constructed setting and adjusting means for regulating and automatically controlling the time of making the mechanical contact between the thermostatic strip and the oscillating rod, and of the interruption of the electric circuit through the said electrical contacts.

Other objects of this invention not at this time more particularly enumerated will be more fully understood from the following detailed description of the present invention.

With the various objects of the invention in view, the said invention consists, primarily, in the novel thermostatic control-mechanism hereinafter set forth; and, the said invention consists, furthermore, in the novel arrangements and combinations of the various devices and parts, as well as in the details of the construction of the said parts, all of which will be more fully described in the following specification, and then finally embodied in the clauses of the claims, which are appended to and which form an essential part of the said specification.

The invention is clearly illustrated in the accompanying drawings, in which:—

Figure 1 is a front elevation of a thermostatic control-mechanism embodying the principles of the present invention, showing its application to the electrical oven or heater, the upper portion of the latter being illustrated in front elevation in said view; and Figure 2 is a side elevation of said thermostatic control-mechanism, and a vertical sectional representation of said portion of the heater or oven, said section being taken on line 2—2 looking in the direction of the arrows, in said Figure 1.

Figure 3 is a view, similar to Figure 2, made on an enlarged scale, with a portion of the enclosing casing of the thermostatic control mechanism shown broken away; Figure 4 is a top or plan view of said Figure 3, with the casing removed; and Figure 5 is a horizontal sectional representation of the same, said section being taken on line 5—5 in said Figure 3. Figure 6 is a detail vertical section, taken on line 6—6 in said Figure 5; and Figures 7, 8 and 9 are perspective views of certain parts of the thermostatic control-mechanism.

Similar characters of reference are employed in the said above described views, to indicate corresponding parts.

Referring now to the several figures of the drawings, the reference character 1 indicates the upper portion of an electrically heated oven or heater of the construction described in the herein-before mentioned application Serial No. 53,969/25, with which the thermostatic control-mechanism embodying the principles of the present invention is employed.

The said control-mechanism comprises a suitable base-plate 3 suitably secured by means of screws 4, or otherwise, to the top-plate 2 of the cabinet 1 of the oven or heater, as will be evident from an inspection of the several figures of the drawings. Suitably mounted upon said base-plate 3 is a front wall 5 and a rear wall 6, and 7 indicates a suitably formed shell or casing-member suitably connected with said front and rear walls. The front wall 5 is made with a laterally extending elongated opening, as 8, said wall also carrying a scale-provided plate 9 which is also formed with a laterally extending opening 10 corresponding to and arranged directly over the opening 8.

In an open portion of the said front wall 5 is a lens 11 of colored glass, as red, and secured upon said base-plate, immediately back of its front wall, by means of screws 12, or in any other suitable manner, is a fixture, as 13, which is provided with a lamp-receiving socket 14, carrying an electric bulb 15, and in suitable electric circuit with binding posts 16 and 17, with which the said fixture 13 is provided in a manner, substantially as indicated in Figures 3 and 4 of the drawings. Suitably secured upon said base-plate 3, immediately in front of its rear wall 6 is a vertical and suitably shaped supporting element 18 made of an insulating material, and carrying a cross-bar 19, also of suitable insulating material. Mounted upon the upper edge of said element 18 by means of screws 22 and 23, are a pair of metal contacts, as 20 and 21, said contacts being further provided with terminal screws 24, or the like, for the attachment thereto of the respective pole-pieces of a pair of suitably constructed electrical by-pass condensers, as 25. Suitably mounted upon the cross-bar 19 are other metal contacts, as 26, 27 and 28, the contact 26 being provided with terminal screws 29 and 30, and binding nuts 31, the contact 27 being provided with terminal screws 32 and 33, and binding nuts 34, and the contact 28 being provided with terminal screws 35 and 36, and binding nuts 37.

Suitably connected with, and extending outwardly from the rear wall 6 is a suitably constructed plug-receiving element, as 38, for attachment thereto of the usual main line plug, for completion of an electric circuit with the main source of electricity, as will be evident. Suitably connected with this plug-receiving element 38 are two circuit-wires 39 and 40, the wire 39 being attached to the terminal screw 30 and its nuts 31, and the wire 40 being attached to the terminal screw 33 and its nuts 34.

Leading from said terminal screw 30 is a circuit-wire 41, attached to a binding screw 42 of the terminal plate 43, carrying the screw 16. Similarly attached to the binding screw 44 of a terminal plate 45, carrying the screw 17, is a circuit-wire 46 attached at its other end to the terminal screw 36 and its nuts 37. Also attached to said terminal screw 36 is another circuit-wire 47, which is attached at its other end to the screw 23 of the metal contact 21. Leading from the screw 22 of the metal contact 20 is a wire 48 which is attached at its other end to the terminal screw 32 of the metal contact 27.

Connected with and extending downwardly from the previously mentioned base-plate 3 is a tubular member 49 in which is oscillatorily disposed a rod 50, said rod being formed at its lower portion with a forwardly extending arm-portion, as 51, having its free end slightly laterally bent or curved, as at 52, as indicated in Figure 5 of the drawings. Also, suitably affixed to the said lower portion of the rod 50, by means of a screw or a bolt 53, or other suitable securing means, is the end-portion 55 of a piece of thermostatic metal, as 54, adapted, when the said metal is deflected in the direction of the arrow $x$, shown in said Figure 5, to engage the curved or bent end 52 of the arm-portion 51, so as to also move the latter in the direction of the arrow $x$, as will be evident. The upper end-portion of the rod 50 extends through the said base-plate 3, and terminates, as at 56, some distance above the upper face of the said base-plate. Loosely mounted upon said portion 56 of the rod 50 is the hub-portion 58 of a cam or crank-device, as 57, provided on opposite sides of said hub-portion with laterally extending arms 59 and 60. Connected with and extending forwardly from the arm 59, or other suitable portion of the cam or crank-device 57 is a member 61 of suitable length, with the free end-portion of which is pivotally connected, by means of a pin or screw 62, a laterally extending plate 63 formed at its free end with an upwardly projecting flange 64, carrying a spring-controlled adjusting screw 65. As shown, the said plate 63 is also provided with an elongated opening or slot 66. Pivotally connected with said base-plate 3 by means of a pivot-pin or screw 67 is a forwardly extending arm 68, said arm passing beneath said plate 63, and having a post or stud 69 which extends in an upward direction from the arm 68 into and through the opening or slot 66, as shown more particularly in Figure 6 of the drawings, for normal setting adjustment, by means of the screw 65, of the said arm and its pointer or index 70 at the forward end-portion of the arm where it extends into and through the openings 8 and 10 of the front wall 5 and scale-provided plate 9, with relation of the starting point upon said scale, as will be evident. Attached to said arm 68 is a spring 71, extending laterally therefrom, said spring having its opposite end secured to said base-plate 3 by means of a screw 72, or other suitable fastening means. The said base-plate is also suitably provided with a projection 73 formed with a screw-threaded hole 74, in which is adjustably disposed the screw-threaded shank-portion 76 of an adjusting or setting rod 75. This rod, as is indicated in the drawings, extends in a forward direction through an opening in the front wall 5, and is provided with a knob or fingerpiece 77 for operating the same. The inner end-portion 78 of said rod is in engagement with the surface-portion 79 of the previously mentioned arm 59. The arm 60 of the cam or crank-device 57 is provided with a tubular member or box, as 80, in which is arranged and secured by means of nuts 81 and 82, or other suitable fastening means, the screw-threaded shank-portion 84 of a switch-arm 83.

Suitably secured upon the screw-threaded end-portion 85 of said arm 83, by means of a lock-nut 86, or otherwise, is an element 87 of suitable insulating material, which carries a metal member 88 provided with a binding post 89, and an electrical contact-member 90.

Suitably mounted upon the projecting end-portion 56 of the rod 50 by means of a set-screw 90, or in any other suitable manner, is a member 92 to which is secured by means of a lock-nut 93, or otherwise, the screw-threaded shank-portion 95 of a second switch-arm 94. Suitably secured upon the screw-threaded end-portion 96 of said arm 94, by means of nuts 97 and 98, or otherwise, is an element 99 of suitable insulating material, which carries a metal member 100, provided with a binding post 101, and an electrical contact-member 102. Under normal initial conditions the member 102 is caused to make contact with the member 90 by the action of a coil-spring 103 which is secured at one end to the arm 94 between the lock-nuts 97 and 98 thereon, and at its other end to the arm 83 by means of the lock-nut 81 upon said arm. A circuit-wire 104 extends from between the binding nuts 37 upon the terminal screw 36 to the binding post 89 of the metal member 88, and similarly, a circuit-wire 105 extends from between the binding nuts 34 upon the terminal screw 33 to the binding post 101 of the metal member 100, the purpose being to complete an electric circuit through the said metal members 88 and 100, and their contact-members 90 and 102 when in normal engagement with each other, as will be fully understood from an inspection of Figure 4 of the drawings.

Having in the foregoing description set forth one general arrangement and combination of devices and parts illustrating one embodiment of the principles of the present invention, we will now briefly set forth the manner of interrupting the electrical circuit through the above-mentioned make and break contacts.

The device, as has been stated, is intended for use preferably with heaters set forth in the application for Letters-Patent, Serial No. 53.969/25, to which it is applied, substantially as shown in Figures 1, 2 and 3 of the drawings.

The arm 68 and its pointer 70 having been properly adjusted by means of the screw 65 and the setting rod 75, electric current is admitted into the plug-receiving element 38 by the usual connection with the main line of the general source of electricity.

Referring now more particularly to Figure 4 of the drawings, it will be seen, that a complete circuit is established from the device 38, through wire 39, terminal screw 30 and contact 26, through a circuit-wire 106, connected with the binding post 29, into the heater and the electric heating unit therein. Thence, from said unit, the current is conveyed by means of a circuit-wire 107 to the binding post 35, through the contact 28 and the terminal screw 36, through wire 104, binding post 89, the metal member 88 and the contact-member 90 in engagement with the contact-member 102; then through the metal member 100 and binding post 101, through the circuit-wire 105, the terminal screw 33, and the circuit-wire 40 to the device 38.

Part of the electric current coming in through the wire 39, and screw 30, will also pass through the wire 41 into the device 13 and the electric light 15, the light-circuit being completed through wire 46, screw 36, wire 104, the make and break contacts 90 and 102, wire 105, screw 33, and wire 40 to the device 38. Thus the lighted lamp will indicate through the lens 11 that electrical contact is being maintained by the members 90 and 102, and that the electric circuit through the heater is uninterrupted. However, as soon as the temperature within the heater reaches or rises beyond the predetermined danger-mark, then the distorted thermostatic metal member 54 moves toward the end-portion 52 of the arm-portion 51 of the rod 50. The rod 50 is thus caused to rotate in the tubular member or bearing 49, and in turn swings the switch-arm 94 in lateral direction, so that the member 102 is moved out of its contact with the member 90, thereby interrupting the lamp-circuit, as well as the circuit through the heater.

To take care of sparking, the by-pass condensers 25, in circuit by means of the wires 47 and 48, with the screw 36 and post 32 may be used, if desired. The distance between the thermostatic member 54 and the end-portion 52 of the arm-portion 51 may be desirably varied, by operating the setting or adjusting rod 75, thus changing the relative positions of the device 57 and its parts, with relation to the rod 56, thus either increasing or decreasing the space between the parts 52 and 54, as may be desired.

Of course, we are fully aware that changes may be made in the general arrangements and combinations of the several devices and their parts, as well as in the details of the construction of the said parts, without departing from the scope of the present invention as set forth in the foregoing specification, and as defined in the clauses of the claims which are appended thereto. Hence, we do not limit our present invention to the exact arrangements and combinations of the several devices and parts as described in the said specification, nor do we confine ourselves to the exact details of the construction of the said parts, as illustrated in the accompanying drawings.

We claim:—

1. A thermostatic control-mechanism comprising a base, a crank-device movably mounted upon said base, a pair of contact-making and breaking switch-arms associated with said crank-device, an index-arm carried by said crank-device, a screw-threaded projection upon said base, and a screw-threaded setting arm movably disposed in said projection for setting said crank-device and its index-arm, associated with a thermostatic means for independently actuating one of said switch-arms for breaking the electrical contact of said switch-arms, consisting of a bearing with which said base is provided, a rod oscillatorily disposed in said bearing, said rod having a lower portion extending from said bearing, an arm-portion extending from said lower portion of the rod, and a strip of thermostatic metal attached to said bearing adapted to engage the arm-portion of said rod for actuating said last-mentioned switch-arm.

2. A thermostatic control-mechanism comprising a base, a crank-device movably mounted upon said base, arms extending laterally on opposite sides of said device, a tubular box carried by one of said arms, a contact-making and breaking switch-arm having an end-portion extending into said box and secured thereto, another contact-making and breaking switch-arm associated with said crank-device, but having a movement independent of the movement of said crank-device, said switch-arms being normally in contact with each other, an index-arm carried by said crank-device, a screw-threaded projection upon said base, and a screw-threaded setting arm movably disposed in said projection and having an end-portion in engagement with the other laterally extending arm of the crank-device for setting said crank-device and its index-arm.

3. A thermostatic control-mechanism comprising a base, a crank-device movably mounted upon said base, arms extending laterally on opposite sides of said device, a tubular box carried by one of said arms, a contact-making and breaking switch-arm having an end-portion extending into said box and secured thereto, another contact-making and breaking switch-arm associated with said crank-device, but having a movement independent of the movement of said crank-device, said switch-arms being normally in contact with each other, an index-arm carried by said crank-device, a screw-threaded projection upon said base, and a screw-threaded setting arm movably disposed in said projection and having an end-portion in engagement with the other laterally extending arm of the crank-device for setting said crank-device and its index-arm, associated with a thermostatic means for independently actuating one of said switch-arms for breaking the electrical contact of said switch-arms.

4. A thermostatic control-mechanism comprising a base, a crank-device movably mounted upon said base, arms extending laterally on opposite sides of said device, a tubular box carried by one of said arms, a contact-making and breaking switch-arm having an end-portion extending into said box and secured thereto, another contact-making and breaking switch-arm associated with said crank-device, but having a movement independent of the movement of said crank-device, said switch-arms being normally in contact with each other, an index-arm carried by said crank-device, a screw-threaded projection upon said base, and a screw-threaded setting arm movably disposed in said projection and having an end-portion in engagement with the other laterally extending arm of the crank-device for setting said crank-device and its index-arm, associated with a thermostatic means for independently actuating one of said switch-arms for breaking the electrical contact of said switch-arms, consisting of a bearing with which said base is provided, a rod oscillatorily disposed in said bearing, said rod having a lower portion extending from said lower portion of the rod, and a strip of thermostatic metal attached to said bearing adapted to engage the arm-portion of said rod for actuating said last-mentioned switch-arm.

In testimony, that we claim the invention set forth above we have hereunto set our hands this 29th day of September, 1925.

VALENTINE WEBER.
EDWIN G. PRICE.